United States Patent [19]
Othmer

[11] 3,856,508
[45] Dec. 24, 1974

[54] METHOD FOR PRODUCING ALUMINUM CHLORIDE, ALUMINUM METAL, AND IRON DIRECTLY FROM ORES

[76] Inventor: Donald F. Othmer, 333 Jay St., Brooklyn, N.Y. 11201

[22] Filed: May 3, 1973

[21] Appl. No.: 356,905

Related U.S. Application Data

[63] Continuation-in-part of Ser. No. 103,765, Jan. 4, 1971, Pat. No. 3,793,003, and a continuation-in-part of Ser. No. 308,059, Nov. 20, 1972.

[52] U.S. Cl............................ 75/29, 75/33, 75/40, 75/68 A, 75/68 B, 75/91, 423/135, 423/136, 423/137, 423/149
[51] Int. Cl. ...................... C21b 15/00, C22b 21/00
[58] Field of Search .......... 423/136, 135, 137, 149; 75/36, 91, 68 R, 68 A, 68 B, 29, 40, 33; 204/164

[56] References Cited
UNITED STATES PATENTS

| | | | |
|---|---|---|---|
| 1,866,731 | 7/1932 | Staib | 423/136 |
| 1,987,629 | 1/1935 | Miner | 75/72 |
| 2,617,761 | 11/1952 | Sheer et al. | 204/164 |
| 3,244,509 | 4/1966 | Nowak et al. | 75/29 |
| 3,466,169 | 9/1969 | Nowak et al. | 75/112 |
| 3,708,409 | 2/1973 | Bainbridge | 204/164 |

*Primary Examiner*—Herbert T. Carter

[57] ABSTRACT

Aluminum may be separated as a halide from ores or from ore residues hitherto considered unusable for aluminum production through conventional processing. Aluminum in the ore is converted to a volatile trihalide, while iron, always present in such ores or ore wastes, is removed as substantially pure metal. Ferric halide may be formed in a first halogenation at about 700°C–1050°C. This is treated in a blast furnace-like reactor to the solid residue from the first halogenation, along with carbon, at a temperature up to 1600°C or higher, to give vaporous $AlCl_3$ or $AlCl$ overhead and molten iron from the base. A single reactor may combine both reactions in one heating for ore solids. $AlCl$ may be disproportioned to give aluminum metal. Other selected steps produce an aluminum halide or aluminum metal from clays, feldspars, oil shales, red muds from current aluminum production wastes, slimes from phosphate manufacture, slags from iron and manganese blast furnace operations, etc., while producing economically and almost quantitatively the other metal values of the ores or ore wastes.

11 Claims, 4 Drawing Figures

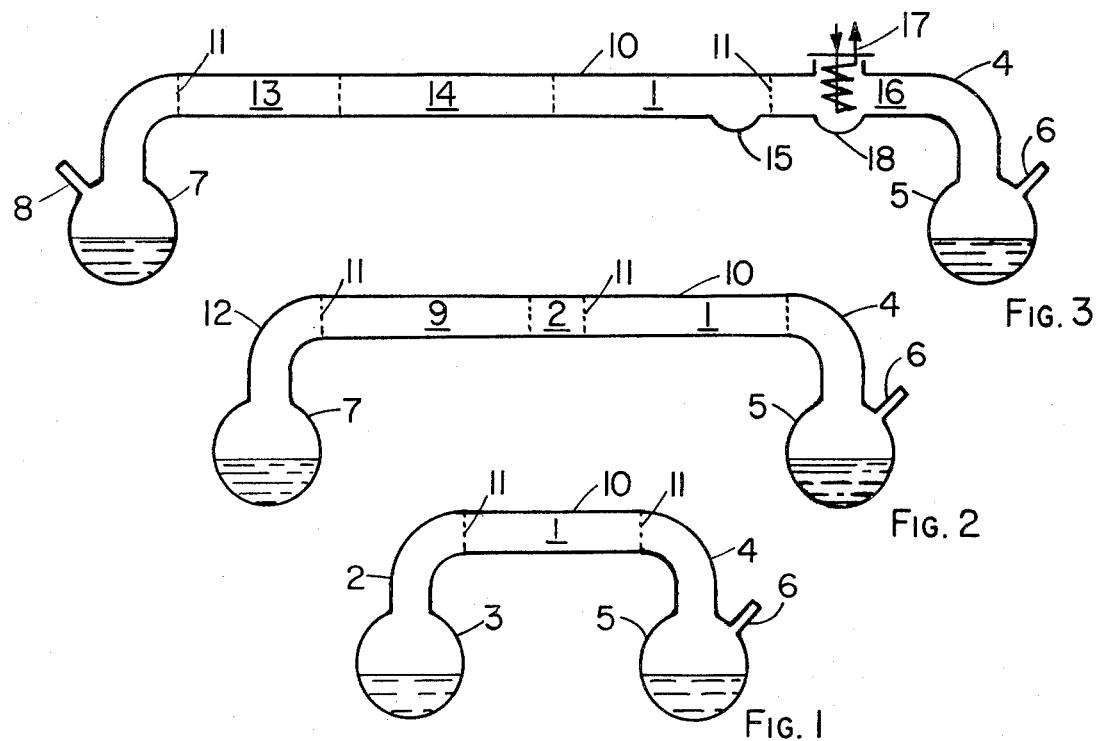
FIG. 3
FIG. 2
FIG. 1
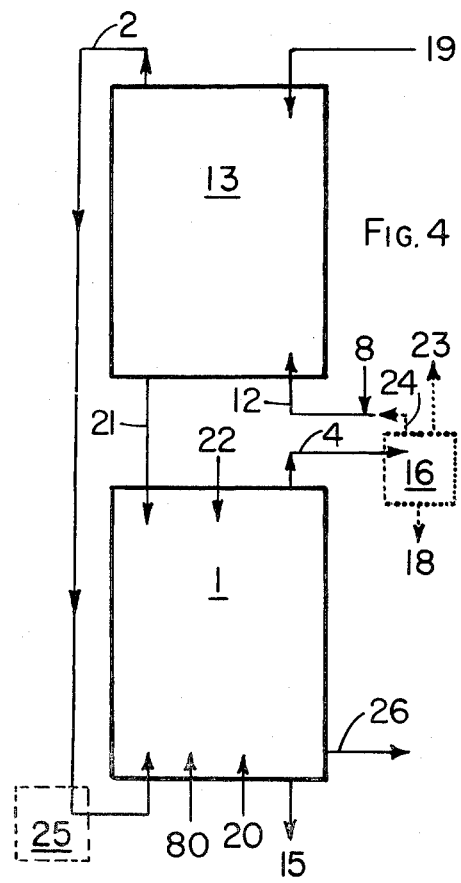
FIG. 4

METHOD FOR PRODUCING ALUMINUM CHLORIDE, ALUMINUM METAL, AND IRON DIRECTLY FROM ORES

This application is a continuation in part of copending applications: - U.S. Ser. No. 103,765 now U.S. Pat. No. 3,793,003 of Jan. 4, 1971 and of U.S. Ser. No. 308,059 of Nov. 20, 1972.

The process of this invention allows the winning of aluminum halides and iron directly from various ores containing aluminum and iron, including bauxites, clays, shales, slates, feldspars, slags from iron and manganese blast furnaces, and others which, because of their large content of other oxides and the chemical nature of the compounds of these oxides with each other and with alumina, are unsuitable for winning of aluminum and iron values by conventional methods. Halogens, and particularly fluorine, chlorine and bromine, are used for the attack on the ore. The corresponding volatile halides which are formed of aluminum, iron, and other metals, are separately removed or reacted to remove substantially pure aluminum tri- or monohalides and also metallic iron therefrom in a single heating operation, sometimes by steps, but without intermediary cooling and heating. Other metallic compounds or metals may be separated by additional steps; and the mono-halides may be disproportionated to give metallic aluminum by known means.

Hereinafter, the more common chlorine, chlorination, and chlorides are usually referred to with the understanding that fluorine, fluorides, and fluorination, also bromine, bromination, and bromides, may often be considered as equivalent for every step of the processes concerned, and with some respective advantages and disadvantages in different cases.

CHEMICAL REACTIONS USED IN RELATED PRIOR ART

When an aluminum-containing ore is chlorinated by methods known to the prior art, those elements, including particularly iron, phosphorous, vanadium, etc., which have a greater affinity for chlorine from the oxide than does aluminum, may be volatilized as the chlorides or oxychlorides and removed first. While iron comes as the ferric chloride - and in the gas phase it probably has the formula $Fe_2Cl_6$, a dimer - for the present purpose this is of no importance; and it will be called simply $FeCl_3$. In other reactions which are part of this invention, ferrous chloride, $FeCl_2$, may be obtained. Selective chlorinations wherein actually a two-step operation isused, an oxidation-chlorination (without a reductant) and a reduction-chlorination (with a reductant), are more fully explained in the article: Halogen Affinities - A New Ordering of Metals to Accomplish Difficult Separations, A.I.Ch.Journal, Vol.18, p.217, January 1972. Either or both may be used as required for the purpose at hand, but are not always described separately as being part of the prior art.

Also in this invention, only reduction-chlorinations are sometimes used with obvious advantages over the sequence of oxidation-chlorinations alternating with reduction-chlorinations as practiced in the prior art.

Along with the volatile chlorides of these elements will come $SO_2$ from sulfur present in the ore or in the reductant, together with phosphorous and vanadium as the oxychlorides. Under these conditions of a chlorination under a temperature in the range of 700° to 1050°c, all of these elements form volatile compounds. The aluminum may next be chlorinated to give the normal chloride, $AlCl_3$, which is also volatilized. Thus, the iron chlorides pass off first, then aluminum chloride, then silicon chloride passes off, each in turn as practically pure gases, with evolution of heat: -

$$Fe_2O_3 + 3Cl_2 \rightarrow 2FeCl_3 + 3CO + \text{Heat} \quad (1a)$$

$$Fe_2O_3 + 3C + 2Cl_2 \rightarrow 2FeCl_2 + 3CO + \text{Heat} \quad (1b)$$

$$Al_2O_3 + 3C + 3Cl_2 \rightarrow 2AlCl_3 + 3CO + \text{Heat} \quad (2)$$

$$SiO_2 + 2C + 2Cl_2 \rightarrow SiCl_4 + 2CO + \text{Heat} \quad (3)$$

Also, in the absence of carbon, or in the presence of carbon below about 1600°C, there will be produced in an oxidation-chlorination the chloride of a metal higher in the chlorine series, e.g.: -

$$2AlCl_3 + Fe_2O_3 \rightarrow 2FeCl_3 + Al_2O_3 \quad (4a)$$

Under reducing conditions, with carbon present: -

$$4AlCl_3 + 3Fe_2O_3 + 3C \rightarrow 6FeCl_2 + 2Al_2O_3 + 3CO \quad (4b)$$

These reactions and other similar ones involving silicon and other impurities, may be operated in a sequence resembling the usual fractional distillation of compounds of greater volatility (lower boiling point) away from those of lesser volatility in a succession of steps, as explained in the reference cited above. However, here, instead of volatility alone, there is used the additional property of the affinity for chlorine of a metal to form the chloride from its oxide, and particularly the interchange of oxygen from an oxide of a metal higher in the affinity series with the chlorine of a chloride of a metal lower in the series. Thus, the silica, below aluminum in the series, will be chlorinated if equilibrium conditions are met, after all aluminum and iron have been vaporized as the chlorides. Any $SiCl_4$ which is formed before all possible $FeCl_2$, $FeCl_3$, and $AlCl_3$ is formed, will react with $Fe_2O_3$ and $Al_2O_3$ in the ore to give the respective chlorides and silica.

While these reactions have long been known in the art individually, there have been major problems in commercializing any process using them with the ores or ore wastes to separate aluminum in a valuable form, as the chloride or as the metal, also metallic iron, from these presently valueless materials.

CHLORINATIONS IN THE PRESENT INVENTION BASED ON CHLORINE

At the temperature of about 1050°C and higher, it has now been found that the $FeCl_3$ or $FeCl_2$ formed as above in Equations 1a, 1b, 4a or 4b, may be reacted in a reduction-chlorination of the $Al_2O_3$ free of iron, which may come from the reactions of Equations 4a and 4b to give directly aluminum chloride and molten iron.

Sufficient carbon (as coke) is added, not only to accomplish the reducing action, but also, if necessary, to burn with added gaseous oxygen to give whatever heat may be necessary to maintain this high temperature. At a temperature above about 500° C, but below about 1050°C, the reaction is that of Equation 4a, regardless of the presence of carbon, but above about 1050° the chemical reaction has now been found to be: -

$$Al_2O_3 + 2FeCl_3 + 3C \rightarrow 2AlCl_3 + 2Fe + 3CO \tag{5a}$$

and above about 1400°C the reaction with ferrous chloride is:

$$Al_2O_3 + 3FeCl_2 + 3C \rightarrow 2AlCl_3 + 3Fe + 3CO \tag{5b}$$

Similarly, if silica is present, the following reaction has been found to proceed above about 1050°C:

$$3SiO_2 + 4FeCl_3 + 6C \rightarrow 3SiCl_4 + 4Fe + 6CO \tag{5c}$$

The $SiCl_4$ may be used as a chlorinating agent in Equation 8b below. These reactions wherein iron chlorides, previously separating the iron from an aluminous ore, and now reduced to metallic iron, are an essential part of this invention.

If these reactions of Equations 5a and 5b are conducted at a temperature somewhat or considerably above 1535°C, the iron is molten and the operation resembles that of a blast furnace; i.e., a gas-solid reaction giving molten iron to be tapped off at the bottom.

These same reactions of Equations 5a and 5b will take place with the $Al_2O_3$ in an original ore if charged, and if the temperature is high enough the iron oxide will be smelted to iron as in the standard blast furnace.

The aluminum atom is normally trivalent; but it changes to mono-valency; and aluminum compounds disproportionate at various temperatures higher than about 1100°C. Hence, at the temperature of the blast furnace reactor (1650°–1850°C) AlCl is the stable chloride. Thus, when $FeCl_3$ gas is heated with $Al_2O_3$ to temperatures above 1600°C, which is above the melting point of iron, more aluminum atoms are reacted with the three chlorine atoms of the ferric chloride molecule to give aluminum monochloride, thus:

$$3Al_2O_3 + 2FeCl_3 + 9C \rightarrow 6AlCl + 2Fe + 9CO \tag{6a}$$

and above about 1750°C, the reaction with $FeCl_2$ is:

$$Al_2O_3 + FeCl_2 + 3C \rightarrow 2AlCl + Fe + 3CO \tag{6b}$$

Again, this reaction takes place with either iron-free $Al_2O_3$ or with $Al_2O_3$ in an ore as above described.

The ratio of $Al_2O_3$ to $FeCl_2$ or $FeCl_3$ in the ore, also to carbon in the coke, along with the reaction temperature (controlled by addition of oxygen and more coke) determines the relative production rates and hence relative amounts of $AlCl_3$ and $AlCl$ formed by Equations 5a and 5b and 6a and 6b and discharged from the blast furnace reactor in a gas stream.

Equations 6a and 6b are corollaries to the well known reaction:

$$AlCl_3 (gas) + 2Al(solid) + Heat \rightleftharpoons 3AlCl(gas) \tag{7}$$

If heat is supplied, this reversible Reaction 7 is known to go from left to right, above about 1250°C, and is reversed to go from right to left below about 1250°C, with heat being given off. Similarly, Reactions 6a and 6b proceed at the blast furnace temperature to give AlCl, which may be disproportionated to $AlCl_3$ at lower temperatures. Hence, by rapidly cooling the AlCl vapor below 1000°C, the aluminum atom again assumes its usual tri-valency; and the reaction, if the cooling is done sufficiently fast, liberates pure aluminum metal as a liquid above its melting point of 660°C, or as a solid if below this temperature. If the cooling is not sufficiently fast, the aluminum formed is oxidized by CO to $Al_2O_3$. By operating a condenser at about 700°C, the pure liquid aluminum formed may flow into molds and solidify as ingots. This condensation to produce aluminum metal by disproportionation is described more completely in co-pending U.S. application Ser. No. 103,765 of Jan. 4, 1971, and 308,059 of Nov. 20, 1972.

If, however, the reduction of the $FeCl_2$ or $FeCl_3$ is operated below the melting point of iron, solid iron is formed in small particles in the reactor; and the design of the reactor is different from that of a blast furnace. In this case, also if a special cooler is not used, the resulting chloride formed will be largely $AlCl_3$.

Besides the $FeCl_3$ in the gas stream passing to the blast furnace reactor, there may be, intentionally or inadvertently, one or more of three other chlorinating agents under these conditions: (a) both atoms in the molecule of chlorine, i.e., $Cl_2$ itself; (b) all of the chlorine atoms present in some other gaseous metallic chloride, as $SiCl_4$ of an element lower in the affinity series; or (c) two of the chlorine atoms present in $AlCl_3$. Any of these may then produce AlCl by reaction directly with the oxide $Al_2O_3$ through these reduction-chlorination reactions. Thus:

$$Cl_2 + Al_2O_3 + 3C \rightarrow 2AlCl + 3CO$$
(above about 1600°C) \tag{8a}

$$SiCl_4 + 2Al_2O_3 + 4C \rightarrow 4AlCl + 4AlCl + 4CO + SiO_2 \tag{8b}$$

(above about 1700°C)

$$AlCl_3 + Al_2O_3 + 3C \rightarrow 3AlCl + 3CO \tag{8c}$$

(above about 1800°C)

If Equations 1a and 5a are combined by numerical addition, there results:

$$Fe_2O_3 + Al_2O_3 + 6C + 3Cl_2 \rightarrow 2AlCl_3 + 2Fe + 6CO \tag{9}$$

Similarly, Equations 1a and 6a combine to give:

$$Fe_2O_3 + 3Al_2O_3 + 12C + 3Cl_2 \rightarrow 6AlCl + 2Fe + 12CO \tag{10}$$

Comparable equations may be written for the reactions involving ferrous chloride.

The reaction of Equation 9 has been found to proceed satisfactorily in a single reactor at a temperature above about 500°C to give $AlCl_3$ as a gas, and iron in the form of small solid particles in a slag of other impurities, if a natural ore is used. The reaction of Equation 10 proceeds at a temperature above about 1300°C and thus goes very well at a temperature above the meltng point of iron in a blast furnace-type reactor to give gaseous AlCl and molten iron (and a slag, if a natural ore is used, containing $SiO_2$, silicates, also oxides of other metals lower than aluminum in the chlorine affinity series and non-volatile chlorides formed of metals higher than aluminum in the series).

However, in both cases, the control of the single reactor may be somewhat more difficult than the control of two separate reactors operating at the different temperatures indicated above; and each doing one of the important component reactions, i.e., first the formation of the iron chloride, then its reduction to iron by aluminum oxide and carbon while aluminum chloride is being formed.

All of the above reactions in both reactors proceed using coke sufficient for the reduction-chlorination and also to burn with oxygen to supply additional heat, e.g., $C + O_2 \rightarrow CO_2$ --- or $C + 1/2\text{-}O_2 \rightarrow CO$. Commercial oxygen above about 90% is preferable; pure $O_2$ above 99% can be used but is too expensive; air as such or enriched with 90% $O_2$ may often be most economical. Considering the heat quantites of the reactions themselves, the heat needed to bring the reactants up to temperature and that needed to maintain the reactors at their respective high temperatures, there may be required added coke to speed up the reactions to give added heat. This amount will depend on:

a. the particular ore used and therefore the composition of the solids being treated by the gaseous chlorination agents in the reaction zones;

b. the relative amounts of $Cl_2$, $SiCl_4$, and $AlCl_3$ which are used in the reduction-chlorinations, since there are different amounts of heat given off with each of the different chlorinating agents in its respective reaction;

c. the type of reactors used and therefore the degree of completion of the reaction, also the amount of heat lost to the surroundings.

The careful addition to one or both reactors of chlorine and also of oxygen, preferably as such (although air may sometimes be used) so that the correct stoichiometric amounts are not exceeded, is the most essential control of the process of the invention. Neither of these reactive gases should be discharged in the exit gases of the high temperature reactor with the $AlCl_3$. Hence, in the operation of the important reaction represented by Equation 5a and/or 5b, there must always be present an excess of alumina.

The oxygen to combust the coke must always be furnished in ample amount to provide the supply of heat to the mixture of the iron-free and the reductant to maintain the high temperature of over 1600°C, somewhat above the melting point of iron; or even 1800° to 2000°C or higher if Equation 8c is to proceed. This oxygen will be added to the reaction zone which is here described as similar to a blast furnace. As is also obvious, the temperature of the reactor and the control of carbon and $Al_2O_3$ ratios to each other and to the chlorinating gas determines whether the aluminim discharging in the gas phase is principally as the trichloride or the monochloride.

The oxygen to combust an amount of coke which is added over and above that needed for reduction-chlorination may be supplied in admixture with the gas stream containing $FeCl_3$ and $FeCl_2$; or it may be through a separate inlet. In either case, the control of the oxygen supply is based on the temperature of the blast furnace reactor wherein some or all of the reactions of Equations 5a, 5b, 6a, 6b, 8a, 8b, or 8c take place. If the temperature falls below that required by the desired reaction and equation, more oxygen is added; if it rises too high, the supply of oxygen is throttled.

In the use of coke for heat and also in the reduction-chlorinations, more or less $CO_2$ is formed; but the corresponding equations are not written here for this obvious modification.

The attack on almost any aluminous ore or ore waste by chlorine in the process so described is such that the iron may be removed as $FeCl_3$ (or as $FeCl_2$ in the presence of carbon) almost quantitatively at temperatures of 700°C to 1050°C; and the aluminum, principally as $AlCl_3$ above about 1050° or 1100°C; or principally as AlCl at temperatures above about 1600°C in the blast furnace reactor. The ratio of $AlCl_3$ to AlCl formed depends also on the relative amounts or analysis of the oxide materials present in the ore and of the coke. These ores which may be used include various clays, shales, and other minerals widely distributed in nature and of little present value, as well as metallurginal wastes - such as usual blast furnace slags from iron and manganese production, red muds from Bayer processing of bauxite, tailings from phosphate rock beneficiation etc. These ores and ore wastes are entirely nonusable by the conventional Bayer process for making alumina, since the presence of $SiO_2$, and particularly its association with $Al_2O_3$ in the ore makes difficult and expensive the conventional attack with caustic soda and the accompanying loss of this aqueous alkaline reagent. Using chlorine, no reagent is lost in residues conatain aluminum or silicon, as in conventional processing. However, chlorine combines with sodium and other alkaline metals and earths present in the ores to form non-volatile chlorides which remain in the gangue. Magnesium chloride and some other chlorides may be recovered from aqueous solutions resulting from leaching the gangue residue when these soluble chlorides are present in sufficient value.

The preliminary handling of the ore and the coke to be used requires their preparation to give a range of particle size preferably of 60 to 100 microns, although larger sizes may also be used, up to 3mm, with corresponding danger of slowing down the gas-solid reactions. These pulverent or particulate masses must be thoroughly dried and calcined at a temperature high enough to drive off all free water and as much as possible of any combined water. Water added to the system in the added ore, coke, or otherwise, unites with the chlorine present as such or chlorides of metal lower than hydrogen in the affinity series, to give hydrogen chloride which may be a waste of chlorine and a nuisance in the operation. Intimate mixing of the ore and coke is necessary in their pulverent or particulate forms. Either term herein includes the range of sizes from 50 microns to 3 mm particles.

The chemcial reactions (except that for disproportioning AlCl to give aluminum metal and $AlCl_3$ are accomplished by the contacting of gases with pulverent solids; and each reaction has been found to go very fast because of the small size of the solid particles and hence the large ratio of surface for reaction to mass to be reacted. Furthermore, these reactions are chlorinations by chlorine gas or by a gaseous metallic chloride of a metal whose oxide has the less affinity for the chlorine; and they always result in the formation of either a gaseous chloride which is removed from the reaction scene by its volatility, or of a non-volatile chloride which stays with the gangue. Higher temperatures cause reactions to go faster, but these advantages have to be balanced against other considerations, such as: - (a) undesirable side reactions, (b) deterioration of materials of construction of reactors at higher temperatures; also (c) cost of additional thermal energy required to bring and maintain reactants to and at higher temperatures.

The invention comprises a series of novel chemical reactions in combination; and these may be accomplished by either batch or continuous processing in two gas-solid reaction zones or in a single gas-solid reaction zone in addition to the special condenser for disproportionating $3AlCl$ to $2Al + AlCl_3$ when this reaction is also conducted in a closely joined unit. If continuous processing is used, as usually is advantageous, the one or two gas-solid chlorinating reactors would each have an equivalent of two or three equilibrium units or stages so that a countercurrent reaction of every molecule in both the gas stream and the solid stream can be completed fully. The height of the reactor at the higher temperature which possibily may be of type of a blast furnace, will insure this; and thus complete the stripping of $Al_2O_3$ to give $AlCl_3$ AlCl, and no aluminum compounds remaining in the "bottom discharge" of molten iron and slag.

Similarly, in the reactor of lower temperature, it is essential that the chlorination of all of the iron in the original clay or other feed material be completed. Thus, the "bottoms discharg" is completely free of iron. However, depending on the relative amounts of iron and aluinum in the ore or ore waste charge, i.e., if there is a lesser number of iron atoms than aluminum atoms, it may be necessary to supply additional chlorine at the discharge point of the iron-free $Al_2O_3$ over that required to make $FeCl_3$ or $FeCl_2$ of all of the iron supplied in the feedstock. This will produce some $AlCl_3$ which will pass, with the $FeCl_3$ streams to the high temperature reactor - or indeed, free chlorine might pass along with the $FeCl_3$. Thus, adequate chlorine is supplied so that all $Al_2O_3$ in the original ore or ore waste will go off as $AlCl_3$ or AlCl. The use of countercurrent reactors, each having several equilibrium units, allows these reactions to go to completion.

If there is more iron than aluminum in the feedstock, some will pass off with the aluminum chloride stream discharging from the high temperature reactor, for later separation. Alternatively, some part may be condensed from the vapor stream entering this reactor or by means suggested in the above mentioned, co-pending application Ser. Nos. 103,765 and 308,659.

Also, as noted above, $SO_2$ may be formed in the reactor of lower temperature from sulfur in the ore or coke; also oxychlorides of vanadium, chromium, or phosphorous may be formed there. All of these are volatile gases at these temperatures and will pass through the high temperature reactor and discharge with the gaseous $AlCl_3$ and/or AlCl.

Cyclone contactors, fluidized beds, fixed beds, and multihearth furnaces are several of the types of contacting devices which may be used to conduct the gas-solid chemical reactions in the lower temperature chlorinator. Thus, the "reaction zone" may be referred to not only as a "reactor," "cell" or a "stage," but also as a "cyclone" or a "hearth." The high temperature reactor may be of the blast furnace type, or it may be of some other suitable type. Attention has already been called to the desirability of having a reactor, of whatever type, with an equivalent two or three equilibrium units.

As noted above, the other chemical reaction of AlCl disproportionating to give aluminum and $AlCl_3$ in a condenser of a special instantaneous type, called a "flash" condenser, actually depends on the extremely rapid cooling of the gas containing the AlCl to some temperature below 1000°C: - herein usually stated as about 700°C, to obtain liquid aluminum rather than the solidified metal below its freezing point, 660°C. The flash cooling prevents the aluminum formed from reacting with CO or other gases in the small fraction of a second required by the flash cooling process. The hot gas cooled instantaneously to 700°C does "condense" aluminum in the familiar physical vapor-liquid phenomena, although the chemical disproportionation probably occurs first, as described in aforementioned applications, U.S. Ser. Nos. 103,765 and 308,059, which also discuss the disposition of other gases in this stream.

OBJECTS AND ACCOMPLISHMENTS OF THE INVENTION

The present invention thus accomplishes:

a. the economical winning of metallic iron and of aluminum chloride, and by further processing, of metallic aluminum itself directly from shales, clays, bauxites, feldspars, manganese and iron blast furnace slags, and other iron and aluminum-containing ores and ore wastes which may contain other elements - or the aluminum itself - in compounds which prevent its economical separation by conventional processes;

b. the profitable recovery for use of various values, principally of phosphorous, iron, and aluminum of waste slimes from the beneficiation of Florida phosphate rock;

c. the use of oil shales for the winning of alumium and other values therefrom, using as the reductant the carbonaceous material therein, or the coke-like residue formed by its pyrolysis;

d. the use of red muds from aluminum processing to obtain almost quantitatively their iron, aluminum, and other values;

e. the chlorination of $Al_2O_3$ in ores to $AlCl_3$ or AlCl by the action of $FeCl_3$ on $Al_2O_3$ at high temperatures, while then producing metallic iron from the $FeCl_3$ first formed;

f. the chlorination of ores or ore wastes containing aluminum for the initial and practically complete elimination of other materials present, first through the removal of the iron chlorides and oxychlorides; then through the reduction of $Al_2O_3$ recovered from the first step with the same $FeCl_3$ and coke to give metallic iron and $AlCl_3$ and/or $AlCl$;

g. the combination in sequential or cyclic steps of these various processes with the several materials indicated so as to maximize the purity of each product formed while minimizing the loss of values of the ore, of reductant, of chlorine, and of heat supply;

h. the use of these several processes with bromine or fluorine rather than chlorine as indicated;

i. the production of aluminum chloride or aluminum metal from ores wherein substantially all of the aluminum and iron values are recovered, to leave a very small amount of disposable gangue and without pollution of air, water, or land.

ALUMINUM-CONTAINING ORES AND THEIR CONSTITUENTS

In general, the clays, shales, bauxites, and other aluminum-containing ores may be considered to be composed - formally - principally of $Al_2O_3$, $Fe_2O_3$, and $SiO_2$, as such, or as mixed oxides. These may come in many molecular complexes, either by themselves, or with numerous other oxides, all of which may be attacked with the use of chlorine and coke as a combination of reagents at the temperatures employed. Other common oxides, often present in very substantial amounts, are those of the alkali and alkaline earth metals, as Na, K, Ba, Mg, and Ca; and these are very high in the chlorine affinity series, thus are readily formed in any chlorination. The halides of these alkali and alkaline earth metals are non-volatile at the temperatures employed, and thus would go out in the final gangue, which is principally $SiO_2$. If of value, and since they are all very soluble in water, they can readily be leached out of this residue and worked up by wet techniques.

Other metals, Pb, Zn, Co, and Ni are very much less apt to be present in aluminum ores, although if iron and aluminum are present in ores of these metals, they may be removed by the processes of this invention. The halides of these metals are readily formed as they are high in the affinity series, the halides are much less volatile; but the oxides, if present, have great affinity to form halides which can all be separated from the aluminum and the iron chloride by additional steps. Similarly, the halides of Mn and Ti, two other metals which are present more often, may be separated by these chlorination processes. The separation from iron-containing ores of: - titanium as the chloride, sulfur as the oxide, and phosphorous and vanadium as the oxychlorides, all in a gas stream which would go with the $FeCl_3$ if sufficient chlorine is supplied, has been well known in the prior art, and would be accomplished similarly here. Usually it is possible to separate the gaseous mixture of chlorides containing also other materials by fractional condensation, fractional distillation, or both, as described elsewhere. While $Fe_2O_3$, $SiO_2$ and $Al_2O_3$ are usually referred to herein as the compounds in the ore of their respective elements, it is understood that the actual compounds of Fe, Si, and Al in the ore may be any which contains oxygen, including but not limited to, any single or mixed oxides, carbonates, silicates, etc.

FIGURES

The Figures are entirely diagramatic, with no relation to dimensions, scales, or even shapes of equipment; and they are essentially flow sheets of the processes of the invention, wherein any suitable pieces of conventional equipment may be used. Not shown are the necessary systems for heating; nor the instruments for the measurement of the temperatures at diffenet parts of the operations, or those for measuring in the various streams the amount of flow of soildis and of gases and of liquid aluminum and liquid iron; nor, indeed, the control valves, feeders, etc. for these streams of solids, liquids, and gases.

FIG. 1 is the diagram of a laboratory set-up to demonstrate the reaction of Equations 5a and 5b, essential reactions of the invention.

FIG. 2 is the diagram of a laboratory set-up to demonstrate the reactions of Equations 4a and 4b, also Equation 5a and 5b.

FIG. 3 is the diagram of a laboratory set-up to demonstrate the reactions of Equation 1a and 1b, Equation 6a and 6b, Equation 8c, and Equation 7 (from right to left).

FIG. 4 is the flow sheet of the operation of the process of the invention in a continuous plant, wherein first a lower temperature is used in a reactor for countercurrent reaction of an ore or of a mixture of ore and coke with chlorine gas, to obtain $FeCl_3$ and iron-free solids; and then a high temperature is used in a second reactor for reacting counter-currently the iron-free solids with the $FECl_3$ (both coming from the lower temperature reaction) to obtain metallic iron, also $AlCl_3$ and/or Al.

LABORATORY DEMONSTRATIONS OF THE CHEMICAL REACTIONS

The several reactions of the new method may be illustrated in the laboratory in an ordinary cobmustion tube with more or less conventional attachments and fittings. These attachments and the tube itself may be made of alumina, graphite, silicon carbide, special sillimanites, some metals, or other suitable materials. Parts may be heated and cooled and thus maintained at the desired temperatures by conventional means, not shown.

In FIG, 1, a section, 1, of the reaction tube, 10 divided off by porous spacers, 11, is charged with a mixture of pulverent $Al_2O_3$ and coke, and heated to 1200 to 1400°C. $FeCl_3$ may have been prepared previously from chlorine and $Fe_2O_3$ and a stream of its vapor in line 2 is supplied by a boiler, 3, initially charged with solid $FeCl_3$ and passed through the pulverent $Al_2O_3$ and coke, where it reacts to give solid metallic iron in the mass and gaseous $AlCl_3$ which passes in a gas stream, 4, to condenser, 5. Here solid $AlCl_3$ is formed, and C passes out an exhaust vent, 6. The presence of metallic iron is readily demonstrated in the mass at 1; and the $AlCl_3$ in the condenser, 5. These indicate the reaction of Equation 5a after the equipment has been disassembled. If a pulverent, dried, aluminum ore containing $Fe_2O_3$ is used instead of pure $Al_2O_3$, the reaction is the same. A similar experiment using a charge in 1 containing $SiO_2$ and coke instead of $Al_2O_3$ and coke demonstrates the reaction of Equation 5C.

In FIG. 2, a first section of the tube, 9, is charged with pulverent $Fe_2O_3$, a second section is empty, and a third section, 1, is charged with a pulverent mixture of $Al_2O_3$ and coke. The $Fe_2O_3$ section, 9, is heated to 700° –1050°C, and supplied with a stream of $AlCl_3$ vapors, 12, supplied by boiler, 7. The $FeCl_3$ resulting in a gas stream, 2, according to Equation 4a, passes to the section where it reacts with the mixture of $Al_2O_3$ and coke, 1, at a temperature of 1100° to 1400°C, to give $AlCl_3$ vapor, and solid iron on or in the particles, also $AlCl_3$, which passes in a stream, 4, to a condenser, 5, for solid $AlCl_3$, with vent, 6. After dismantling of the equipment, the presence of $Al_2O_3$ in the section originally charged with $Fe_2O_3$, 9, shows that the reaction of Equation 4a was accomplished; and the presence of metallic iron in the section orginally charged with $Al_2O_3$ and coke, 1, also of $AlCl_3$ in condenser, 5, that Equation 5a has proceeded.

If the $AlCl_3$ boiler, 7, and condenser, 5, are made interchangeable, the two charges and the reactions in tube, 10, could also be interchanged for a cyclic operation, proceeding the second time from right to left, the third time from left to right, etc.

In FIG. 3, the reaction tube again has three chambers divided by spacers, 11: - the first is charged with a pulverent mixture of $Al_2O_3$, $Fe_2O_3$, and coke, 13; the second is empty, a passage for gaseous $FeCl_3$ and $AlCl_3$; and the third is again charged with pulverent $Al_2O_3$ and coke.

Again $AlCl_3$ may be boiled in boiler, 7, and supplied as the chlorinating gas, this time to chlorinate $FE_2O_3$, in reactor, 13, according to Equation 4a. However, in a cyclic process using $AlCl_3$ some make-up of chlorine is required. Chlorine gas may thus be passed also, supplied from inlet, 8, to react with the first charge, 13, at a temperature of about 700°to 1050°C. Chlorine may be used as the only chlorinating gas or it may be used in any proportion, with $AlCl_3$ from the boiler, 7.

If 13 was a completely countercurrent reactor, only $FeCl_3$ and $FeCl_2$ would issue therefrom until all of the iron in the charge was chlorinated, and all $AlCl_3$ present or formed would interact with the $Fe_2O_3$ in the charge to give $FeCl_3$ or $FeCl_2$ according to Equations 4a and 4b. However, here and possibly also in plant equipment, some $AlCl_3$ in the gas will not contact a particle of $Fe_2O_3$; and a gas mixture of the chlorides of both metals and possibly unreacted $Cl_2$ will pass in 14 through the porous separator, 11, to the pulverent $Al_2O_3$ and coke mixture in 1. The $FeCl_3$ gas at any temperature above about 1050°C reacts, according to Equation 5a; and above about 1535°C gives the iron in liquid form, collecting in a depression, 15, in the tube, 10.

When the reaction in 1 is conducted above about 1800°C, any $AlCl_3$ which has come in the gas stream, 14, will react with $Al_2O_3$ to give $AlCl$ also, according to Equation 8c. Similarly, if there had been silica in the charge to reactor, 13, and it had been chlorinated without an opportunity to react with $Al_2O_3$ or $Fe_2O_3$, the $SiCl_4$ reacts at a high temperature in 1 with $Al_2O_3$ to give $AlCl$, according to Equation 8b.

The gas stream leaving reactor, 1, is instantly or flash chilled in a condenser, 16, to prevent reaction of Al with CO, as described in above mentioned U.S. Pat. applications Ser. Nos. 103,765 and 308,059. It is cooled to a temperature of about 700°C, somewhat above the melting point of aluminum. The $AlCl$ according to Equation 7 right to left, disproportionates to give molten aluminum which collects in a depression, 18, in the tube, 10; and $AlCl_3$ vapors pass with CO and other gases to the condenser, 5, as before. The cooling coil, 17, represents one of several methods of instantly cooling the gas stream by the circulation of a suitable high-boiling fluid, to maintain the temperature at about 700°C.

Here again a cyclic operation may be set up in the operation of the system, with the reactor tube operating either as one or two reactors to accomplish somewhat the same result. Again, there may be a reversal of the $AlCl_3$ condenser and boiler in alternate operations. After the $Fe_2O_3$ has been chlorinated and vaporized away from the charge of the lower temperature reactor, 13, the residual $Al_2O_3$ and any non-volatilizable impurities would be transferred - with fresh coke - to the reactor, 1; and a fresh mixture of $Al_2O_3$, $Fe_2O_3$ and coke would be added to reactor section, 13. With the use of pure $Al_2O_3$, pure $Fe_2O_3$, and pure carbon in a perfect operation in the reactor, 13, and with stoichiometric amounts, all of the aluminum and iron will come out as metals in their respective places; and all oxygen in the ore and all carbon in the coke will go off as carbon oxides through the vent, 6. If silica is present as it is in an aluminous ore, it will come out in a residue or gangue or slag from the high temperature reactor, 1, along with other oxides below aluminum in the affinity series, and with/any chlorides of metals above aluminum in the series which are non-volitile under the conditions.

If now the entire length of the reaction tube, 10, of the bench apparatus of FIG. 3 is charged with pulverent, mixed $Fe_2O_3$, $Al_2O_3$, and coke, gaseous chlorine may be added at 8 to pass through and around the pulverent soilds. No cooling is supplied at 17, so reaction gas discharged goes unchanged to 5. If the temperature is maintained above about 1100°C, but lower than the melting point of iron, the reaction proceeds according to Equation 9, with solid iron particles collecting on and in the solid particles of the reaction mass, as aluminum is vaporized therefrom as $AlCl_2$ which is collected in the condenser, 5. Because of the lack of equilibrium conditions, some $FeCl_2$ or $FeCl_3$ may also be in the $AlCl_3$ collected, and would be separated.

Likewise, if the same experiment is made with chlorine from 8 and/or $AlCl_3$ vapors from 7 passing through the soild charge maintained at a high temperature and a coolant means supplied to maintain the temperature of 16 at about 1700°C, the reaction of Equation 10 proceeds to give liquid iron at 15; and the right to left reaction of Equation 7 gives liquid aluminum at 18, as above described. If $AlCl_3$ from 7 is not used as a chlorinating agent, i.e., only gaseous chlorine is passed, the temperature might suitably be maintained at about 1600°C; if $AlCl_3$, with or without chlorine, is used, the temperature should be maintained above about 1800°C. The comparable conditions with other materials - as silica in the ore - have been discussed above, and the necessary modifications to comparable demonstrations under those conditions are obvious.

PRODUCTION OPERATION OF THE INVENTION

Production of Iron and Aluminum

FIG. 4 diagrams an industrial scale system using the low temperature (700°–1050°C) reactor, 13, and the high temperature reactor, 1, which may be designed somewhat similar to that of a conventional blast furnace. Pulverent ore containing oxygen compounds of iron, aluminum, silicon, and possibly other elements is first calcined, then well mixed with pulverent coke which has also been thoroughly calcined to remove all free, and as much combined, water as possible. In carefully controlled amounts this mixture is fed into 13 by line 19. Often no reductant is required.

Chlorine gas and recycle $AlCl_3$ pass by the line 12 into the reactor, 13, to give a countercurrent flow to that of the pulverent solids in what preferably is at least three equilibrium stages of reaction. This low temperature reactor serves to strip iron by the reaction of Equation 4a from the entering solids; and thus discharges $FeCl_3$ through 2 together with other chlorides and oxychlorides of other elements volatilized under the conditions of the reactor, also $SO_2$, $CO$, $CO_2$, and $N_2$ ( if air supplies the requisite oxygen), etc. $FeCl_2$ is formed also by Equation 4b, and leaves in this stream. Also, this reactor, under proper control of the inlet of gaseous chlorinating agent entering at 12, removes or strips any $AlCl_3$ from the gas stream passing through the reactor and discharging at 2. No reductant is required here by Equ. 4a; but it may be added here, as more convenient here than to reactor, 1.

Iron-free solids discharging from the low temperature reactor, 13, by line 21, also a mixture of pulverent coke by line 22, are passed to the top of the high temperature reactor, 1, and downwardly in countercurrent to the rising stream of gases, including $FeCl_3$ and $FeCl_2$ entering in line 2. This chlorinating gas stream may be augmented by chlorine gas carefully metered in through line 80 and oxygen or air metered in through line 20. The $FeCl_3$ and $FeCl_2$ are reduced to iron by $Al_2O_3$, according to Equations 5a and 5b, and by $SiO_2$ according to Equation 5c. Also at higher temperatures, $AlCl$ is formed according to Equations 6 and 6b; and at 1800°C to 2000°C the chlorinations to form $AlCl$ are completed accroding to Equations 8a, 8b, and 8c.

Unlike the conventional blast furnace, it is highly desirable to have the maximum temperature as high as possible in the shaft of the reactor.

At the bottom of the blast furnace reactor, there is the conventional tapping hole to allow pouring of iron, 15, into the hot metal ladle; and just above is the slag notch for its discharge, 26, into the slag ladle. Neither of these receivers are shown.

A gas mixture containing $CO$, other gases, and at least a major part of the aluminum in the ore as $AlCl$, and some amount of $AlCl_3$ is discharged from the top of the high temperature reactor, 1, through line 4 and directly to a flash cooler, as described in above mentioned U.S. application Ser. No. 308,059. This part of FIG. 4 is therefore shown in dotted lines as not a part of this invention. It discharges aluminum as molten metal through line 18, off gases by line 23, which contain the various volatile oxides, chlorides, and oxychlorides to be worked up for their values, if any, by methods which are not a part of this invention, also a stream of relatively pure $AlCl_3$ which is recycled by line 24, thence by line 12 back to the low temperature reactor in admixture with make-up chlorine from line 8.

As noted particularly in the prior art co-pending applications identfied above, the gas streams leaving by line 2, the chlorination of these clays and/or other ores in the low temperature reactor, 13, will contain a number of gases: $CO$, $CO_2$, $SO_2$, $HCl$, also oxychlorides, as well as $FeCl_3$ and $FeCl_2$. In some cases, it is worthwhile to condense the $FeCl_3$ and $FeCl_2$ in a condenser operated at about the boiling point, 319°C. of $FeCl_3$ and to allow the other, lower-boiling materials, or permanent gases, to pass on uncondensed. They may be condensed out or scrubbed out of this stream later by known methods. The condenser, 25, which is shown in dashed lines since it may not always be used, may be designed so that it may also be used as a condensate receiver and then as a boiler when it becomes charged with $FeCl_3$ and $FeCl_2$; and it is then heated to distill over the iron chlorides as a vapor stream into the high temperature reactor. If two or more such condensers-receivers-boilers, 26, are provided in parallel, one may be used as a condenser-receiver, while the other is being used as a boiler to supply an iron chloride vapor stream to 1 Another advantage of this arrangement is that it may supply the positive pressure to force the vapor stream into 1 against the back pressure existing there. Alternatively, ti may be necessary to supply a blower in line 2 (not shown) between the top of the low temperature reactor, 13, and the bottom of the high temperature reactor, 1, to supply a sufficient flow rate of the $FeCl_3$–$FeCl_2$ gas stream from the top of the low temperture reactor, 13, to the bottom of the high temperature reactor 1.

Production of Iron and $AlCl_3$

It is, of course, possible to operate the combination of the two reactors - low temperature and high temperature - to produce primarily $AlCl_3$ and no metallic aluminum by the flash condenser, 16, of the prior art. If the high temperature reactor, 1, then discharges the stream of $AlCl$ and $AlCl_3$ with other gases passing through line 4 to a conventional $AlCl_3$ condenser, the $AlCl$ will react with the $CO$ and $CO_2$ in the gas stream to give $Al_2O_3$ and $AlCl_3$. The $AlCl_3$ may be separated for its usage otherwise, and the $Al_2O_3$ recycled. This production may be operated with or without the auxiliary condenser-receiver-boiler combination, 25, just described.

Alternatively, and better, the high temperature reactor may be operated at a temperature above 1100°C and below the melting point of iron. Some $AlCl$ will be formed then, along with $AlCl_3$, but none by the chlorination of $Al_2OH_3$ by $AlCl_3$; and two-thirds of this $AlCl$ may be converted to $Al_2O_3$ in an ordinary condenser for $AlCl_3$. If the amount of iron in the ore is small and there is considerable $SiO_2$ as in many clays, it may be most economical to neglect the iron value, operate the high temperature reactor, 1, at a temperature of only about 1100° to 1400°C, and precipitate the small amount of metallic iron as a solid on the silica left to waste after chlorination of the aluminum. Then substantially only $AlCl_3$ is formed and passed to the standard condenser or otherwise processed for further use.

This method of operation is preferred because of the lower temperature required in 1 in those cases where $AlCl_3$ is required for other use or processing without the $AlCl$ to $Al$ plus $AlCl_3$ sequence.

Semi-Continuous Cyclic Production of $AlCl_3$

On a small scale, it is possible to operate the same unit as the reactor vessel for both the low temperature and then the high temperature reactor. Three such reactor vessels, A, B, and C, each identical, may be used in a cycle, with two being used at any one time:

A as low temperature reactor;
B as high temperature reactor; and
C meanwhile being unloaded of solids, then loaded.

A is charged with an intimate mixture of pre-calcined pulverent ore and coke and supplied with a stream of chlorine gas. Some oxygen may also be addded to heat the solids to the reaction temperature, 700°–1050°C. Gas feed, if necessary, should be added so as to contact intimately all solids. A gas stream containing $FeCl_3$ discharges from A to B. together with added oxygen (or air) and more chlorine if necessary. B contains the solids remaining after the first low temperature reaction previously operated therein which has removed therefrom the iron as $FeCl_2$. Again, a thorough contacting of solids with the chlorinating gas stream is accomplished; and the reactor, 3, is maintained at a temperature of about 1100°–1400°C. The resulting gas stream is cooled to condense the $AlCl_3$, and other values in the gas steam leaving B are recovered, depending on profitability. When there is no further discharge of $FeCl_3$ from the low temperature reactor, A, nor of $AlCl_3$ from the high temperature reactor, B, the two are shut down. A new part of the cycle starts, and C, freshly charged with mixed pre-calcined and pulverent ore and coke is placed on stream to take the place of A in the low temperature operation; A, with its charge of iron-free ore and coke takes the place of B; and B, now filled with silica gangue and with solid particles of iron precipitated on the pulverent material, is cooled, dumped, and recharged to take its position again in the cycle. Usually it is preferable (here as elsewhere) to charge to the low temperature reactor pulverent precalcined ore with sufficient coke or other carbonaceous reductant for both reactions rather than to open the reactor vessel for recharging between the two operations, first as the low temperature reactor, then as the high temperature reactor. However, here as elsewhere, no reductant is necessary for Equation 4a.

While this cyclic reactor is indicated to comprise the reactor-vessels, these reactor-vessels, these reactors, may be, instead, fluidized beds or any other type known to the art.

Production of $AlCl_3$ in a Single Vessel Reactor

As noted above, operation at a temperature of about 1100°–1400°C or higher, but below the melting point of iron is possible for the high temperature reactor; but the iron is lost as a precipitate of small solid particles on the silica and other slag remaining. This is not important with many ores which have only a few percent of iron, the value of which may be neglected. However, the reaction of Equation 9 can be carried out in a fixed or fluidized bed as a batch operation or in a vertical shaft furnace maintained at a temperature of aobut 1200°–1400°C. At lower temperatures, the reactions of 4a and 4b prevail. In the batch operation, excess coke or other solid reductant is throughly mixed with the pulverent ore, each of which has been previously calcined to remove water. An air or oxygen blast burns part of the coke to heat the mass to this reaction temperature. Then chlorine gas is added with only enough oxygen or air added to maintain the optimum temperature dependent on the size and design of the reactor. The chlorine continues to flow until $AlCl_3$ ceases to collect in the attached condenser. The iron is lost, deposited on the residual silica.

In this continuous shaft furnace, the charge of ore and coke at the top is added through a gas-tight lock, with provision for exhaust of product gas stream going to an $AlCl_3$ condenser. Chlorine passes upwardly through the mass with a metered amount of oxygen (or air) if necessary to maintain the desired temperature. Solid waste is discharged at the bottom containing the silica, with solid iron particles deposited thereon.

Production or Iron and Aluminum in a Single Vessel Reactor

The reaction of Equation 10 may be performed in a vertical reactor of a modified blast furnace type. A much higher temperature is required, 1600°–2000°c, and preferably about 1800°C. More coke than that required for the chlorination is used with oxygen added, preferably, instead of air to combust the coke and give corresponding heat to raise the temperature to this higher range. The flow sheet is that of the lower reactor of FIG. 4 with the pulverent mixture of the original ore and solid reductant previously calcined to remove water and added at the top through a lock, rather than the residue from the low temperature reactor.

The reaction proceeds with a continuous discharge of AlCl in the off-gas stream. This is passed through the flash condenser previously indicated as known in the prior art, to give $Al_2Cl_3$ and molten aluminum. The $AlCl_3$ is recycled to enter with the chlorinating gas stream at the base of the single reactor for recycle.

Molten iron and slag are tapped periodically as is standard practice in a conventional blast furnace making pig iron.

I claim:

1. A process under substantially atmospheric pressure for producing an aluminum halide from an original material in the form of pulverent solids containing aluminum and iron in compounds with oxygen comprising:
   a. contacting said pulverent solids in a lower temperature reaction zone at a temperature of 500°C to 1050°C in the presence of a solid reductant with a gaseous halogenating agent containing a substantial amount of an aluminum halide; whereby an iron halide goes off in a gas stream; and a soild residue is formed substantially depleted of iron but containing at least most of the aluminum, much of which is in the same compounds present in said original material;
   b. passing at least most of said iron halide in said gas stream to a higher temperature reaction zone which is charged with said solid residue substantially depleted of iron where, at a temperature between 1050°C and 2000°C in the presence of said solid reductant, said iron halide reacts with at least a part of said aluminum in said compounds contained in said residue from said first reaction zone, to form metallic iron and a gas stream containing an aluminum halide;
   c. passing at least a part of said gas stream from said higher temperature reaction zone containing an aluminum halide as a halogenaing agent to said lower temperature reaction zone of (a) where it is contacted with said original pulverent soilds in the presence of said solid reductant to produce said gaseous iron halide and said residue depleted of iron; and
   d. removing said metallic iron from said higher temperature reaction zone.

2. The process according to claim 1 wherein at least part of the heat required to raise said pulverent solids of said original material to the desired temperature of at least one of the reaction zones and to maintain that temperature during a reduction-halogenations is provided by the oxidation of at least a part of said reductant by added oxygen in the respective reaction zone.

3. The process according to claim 1 wherein gaseous chlorine is added to at least one of the said reaction zones to supply at least some part of the gaseous halogenating agent used in said zone; said aluminum halide is a chloride of aluminum, and said iron halide is a chloride of iron.

4. The process according to claim 1 wherein said original material contains silica; at least some part of said halogenating agent in at least one of said reaction zones is a choride of silicon; said aluminum halide is a chloride of aluminum; and said iron halide is a chloride of iron.

5. The process according to claim 3 wherein the temperature of said higher temperature reaction zone is at least 1535°C; and said iron is removed as molten metal.

6. The process according to claim 5 wherein the temperature of said higher temperature reaction zone is at least 1600°C; and said aluminum chloride formed therein is at least in part aluminum monochloride.

7. The process according to claim 6 wherein said aluminum monochloride is disproportioned after leaving said higher temperature reaction zone to give metallic aluminum.

8. The process according to claim 3 wherein said reductant is present in excess over that required for the reactions taking place in said low temperature reaction zone; and said excess reductant remains with said solid residue containing at least most of said aluminum in compounds present in the orignınal material, and is present for the reactions in said high temperature reaction zone.

9. The process according to claim 3 wherein at least some part of said chloride of iron is ferrous chloride.

10. The process according to claim 1 wherein at least a part of said original material is heated in at least two steps to at least 1535°C without intermediary cooling.

11. A process for producing an aluminum chloride from an original material containing aluminum and iron in compounds with oxygen comprising
  a. a first chlorination at a temperature below 1050°C of said original material in the presence of a solid reductant bya first gaseous chlorinating agent comprising a chloride of aluminum to give a gas stream containing a chloride of iron, and pulverent solids containing alumina;
  b. the passing of said pulverent solids containing alumina and at least a part of said chloride of iron to a second chlorination at a temperaure of between 1050°C and 2000°C in the presence of a solid reductant where at least a part of said alumina reacts with said chloride of iron so as to form metallic iron and a gas stream containing a chloride of aluminum, at least part of which is used in step (a).

* * * * *